3,447,723
MATERIAL SPREADER FOR A LAWNMOWER
Thomas G. Peterson and Marvin A. Pomerantz, Des
Moines, Iowa, assignors to Great Plains Bag Co.,
Des Moines, Iowa, a corporation of Iowa
Filed Oct. 5, 1967, Ser. No. 673,119
Int. Cl. B67d 5/54, 47/00, 3/00
U.S. Cl. 222—193                                9 Claims

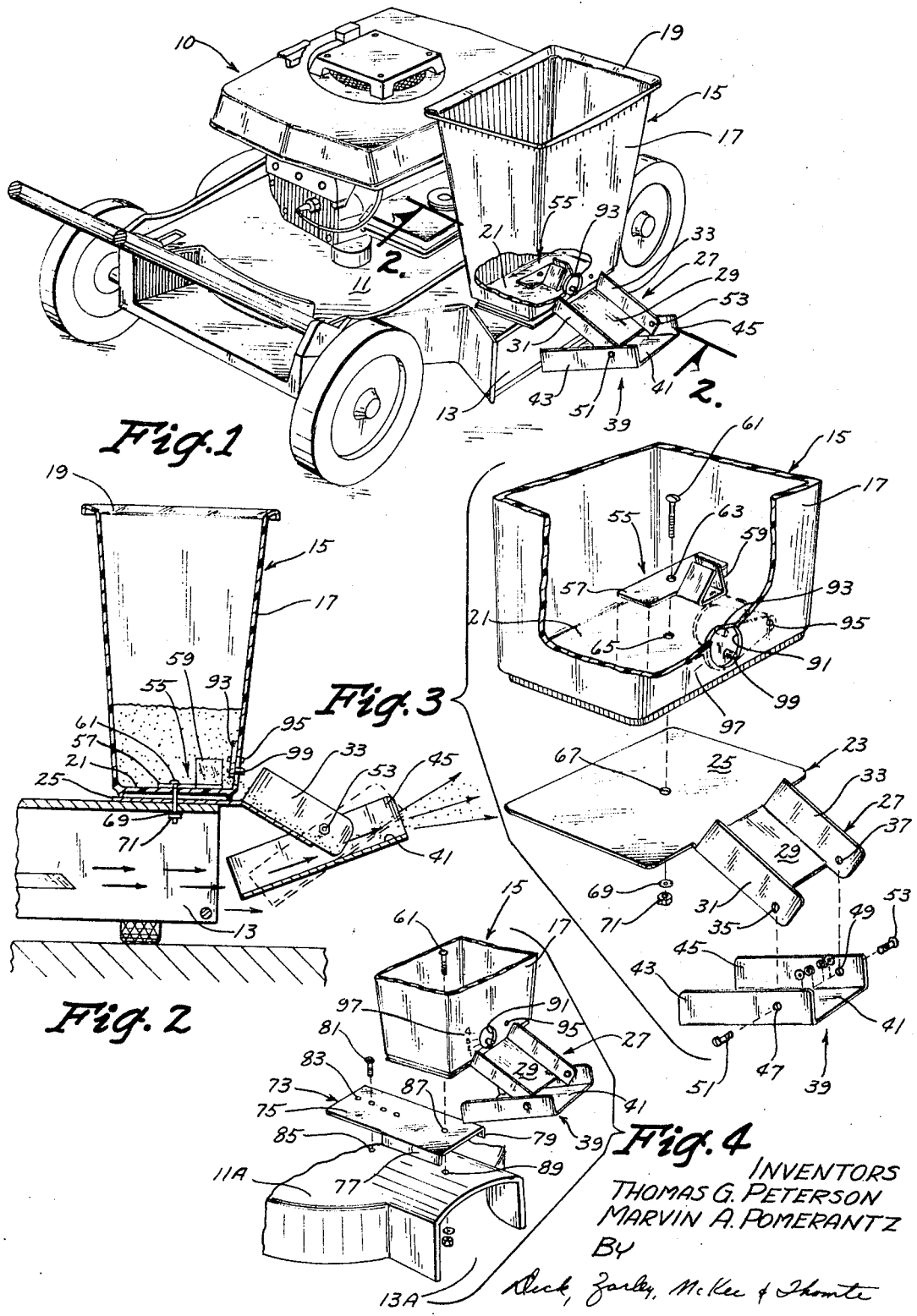

ABSTRACT OF THE DISCLOSURE

A material spreader attachment for rotary lawnmowers which spreads fertilizer, seed, as the the lawnmower is operated. A material container is mounted on the lawnmower housing and has a discharge chute extending downwardly and outwardly from an opening formed therein. An air scoop which is in communication with the lawnmower discharge opening is pivotally secured to the lower end of the chute and is adapted to spread the material being carried thereby.

---

A principal object of this invention is to provide a material spreader attachment for rotary lawnmowers which may be used to spread fertilizer, seed, weed killer or the like while the lawnmower is cutting the grass.

A further object of this invention is to provide a material spreader attachment for rotary lawnmowers which is easily secured to a variety of different rotary lawnmowers.

A further object of this invention is to provide a material spreader attachment having an air scoop means pivotally secured to a discharge chute, the air scoop means being movable to vary the direction and velocity of the material being spread by the attachment.

A further object of this invention is to provide a material spreader attachment for rotary lawnmowers which is extremely simple.

A further object of this invention is to provide a material spreader attachment for rotary lawnmowers which evenly and efficiently spreads fertilizer, seed, weed killer or the like on a lawn as the lawn is being cut.

A further object of this invention is to provide a material spreader attachment for rotary lawnmowers which may be easily removed from the lawnmower when not being used.

A further object of this invention is to provide a material spreader attachment for rotary lawnmowers which includes a material container mounted on the lawnmower housing and which has an anti-clog baffle means positioned therein adjacent a discharge opening formed in the material container.

A further object of this invention is to provide a material spreader attachment for rotary lawnmowers which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a rear perspective view of the material spreader mounted on a rotary lawnmower with portions thereof cut away to more fully illustrate the invention;

FIG. 2 is an enlarged sectional view as seen along line 2—2 of FIG. 1, the broken lines indicating the pivotal movement of the air scoop means;

FIG. 3 is a fragmentary exploded perspective view of the material spreader with portions thereof cut away to more fully illustrate the invention; and FIG. 4 is a fragmentary exploded perpsective view of the material spreader and the auxiliary attaching bracket for use with lawnmowers having a curved housing adjacent its discharge opening.

The numeral 10 generally designates a conventional rotary lawnmower having a housing 11 and a discharge portion 13 through which the grass clippings are blown. The lawnmower 10 seen in FIG. 1 is of the design wherein the housing 11 is substantially flat over the discharge portion 13. The numeral 15 generally designates the material spreader attachment of this invention and includes a container 17 having an open upper end 19 and a bottom 21.

A discharge chute 23 is mounted below container 17 and includes a flat base portion 25 which is positioned between the bottom of the container 17 and the upper surface of housing 11 adjacent discharge opening 13 as seen in FIG. 1. Discharge chute 23 has a channel portion 27 extending outwardly and downwardly therefrom which is comprised of a bottom 29 and opposite sides 31 and 33. As seen in FIG. 3, the lower ends of sides 31 and 33 extend below the lower end of bottom 29 and are provided with openings 35 and 37 therein respectively.

The numeral 39 generally designates an air scoop means which is pivotally connected to the discharge chute 23 and which is comprised of a base 41 having opposite sides 43 and 45 extending upwardly therefrom. Sides 43 and 45 are provided with openings 47 and 49 formed therein adapted to receive bolt members 51 and 53 extending therethrough repsectively. Air scoop means 39 is pivotally connected to the discharge chute by means of bolt members 51 and 53 extending through openings 47, 35 and 49, 37 respectively.

An anti-clog baffle plate 55 is provided in the interior of container 17 at the bottom thereof and includes a plate member 57 having an inverted V-shaped baffle 59 at one side thereof. Baffle 59 is formed by partially cutting the plate member 57 and turning up the ends towards each other to form the inverted V-shape. The attachment is secured to the lawnmower housing 11 by means of a bolt 61 extending through opening 63 in plate member 57, opening 65 in bottom 21 of container 17, opening 67 in discharge chute 23 and through the housing 11. Bolt 61 is rigidly maintained thereon by means of a lock washer 69 and nut 71.

FIG. 4 illustrates an auxiliary attachment bracket 73 which may be used when the lawnmower housing 11A is provided with a curved or rounded housing portion immediately above the discharge opening 13A. Auxiliary attachment bracket 73 includes a base portion 75 having downwardly depending legs 77 and 79 at one end thereof which engage the upper surface of the housing directly above the discharge opening. The auxiliary bracket 73 is secured to the housing 11A by means of a bolt 81 extending through one of the openings 83 and through opening 85 in housing 11A. As seen in FIG. 4, the bracket 73 is provided with a plurality of openings 83 to permit the adjustable attachment of the bracket with respect to the housing 11A. The spreader attachment 15 is secured to the lawnmower by simply extending bolt 61 through the assembly as illustrated in FIG. 3 and also through the opening 87 in mounting bracket 73 and opening 89 in the housing 11A. The engagement of the lower end of the legs 77 and 79 with the rounded upper surface of the housing serves to stabilize the attachment of the material spreader attachment to the lawnmower in those instances where the lawnmower does have the curved housing directly over the discharge opening.

Container 17 is provided with discharge opening 91 formed therein which is in communication with the upper end of channel 27 of discharge chute 23. A gate 93 is pivotally connected to container 17 by means of pin 95 and is movable to selectively close the opening 91. As seen in the drawings, a plurality of calibration marks 97 are provided on container 17 so that the amount of material flowing from the discharge opening 91 may be calibrated. A handle 99 is secured to a gate 93 to facilitate the pivotal movement thereof.

In operation, container 17 would be filled with the fertilizer, seed, weed killer or the like and gate 93 would be initially closed. The lawnmower 10 would then be started and gate 93 would be pivotally moved to the proper calibration mark to cause the proper amount of material in container 17 to flow from discharge opening 91 onto the discharge chute. Air scoop means 39 collects air and grass clippings being discharged from the discharge portion 13 and directs the same upwardly past the lower end of channel 27 which causes the material passing therefrom to be blown upwardly and laterally of the lawnmower as it is being used on the lawn. It can be appreciated that the pivotal movement of air scoop means 39 with respect to the channel 27 will cause the angle of discharge material to be varied. Thus, if air scoop means 39 is rotated in a counterclockwise direction as viewed in FIG. 1, the material would be directed upwardly at a greater angle so that the material would be blown a greater distance from the lawnmower and the material will be discharged a greater distance also due to the fact that the lowering of the inner end of the air scoop means will cause more air and grass clippings to be deflected upwardly thereover.

The baffle 55 prevents the material from becoming clogged at the inner side of the discharge opening 91 so that the material will be uniformly discharged therefrom. As previously stated, the auxiliary mounting bracket 73 would be used to secure the attachment 15 to those lawnmowers having a curved housing immediately above the discharge portion thereof.

Thus it can be seen that an extremely efficient but simple spreader attachment has been provided for use with a lawnmower which permits the seed, fertilizer or weed killer to be applied to the ground or lawn while the lawnmower is being operated. Obviously, the lawnmower may also be used over bare ground to facilitate the spreading of material thereon inasmuch as the air being discharged from the discharge opening 13 of the lawnmower is sufficient to spread the materials being discharged from the container 17. Thus it can be seen that the device accomplishes at least all of its stated objectives.

Some changes may be made in the construction and arrangement of our material spreader for a lawnmower without departing from the real spirit and purpose of our invention, and it is our intention to cover by our claims, any modified forms of structure or use of mechanical equivalents which may be reasonably included within their scope.

We claim:

1. In a material spreader for use with a rotary lawnmower including a housing having a discharge opening formed therein, a container secured to said housing adjacent said discharge opening and having a closable opening formed therein adjacent its lower end, a chute means secured to said housing and having an upper end in communication with said closable opening and extending downwardly and outwardly therefrom, an air scoop means secured to said chute means and having one end in communication with said discharge opening, said air scoop means adapted to receive material from said chute means; said material on said air scoop means being blown from the other end thereof by the air being discharged from said discharge opening into said air scoop means wherein said air scoop means is selectively pivotally secured intermediate its length to said chute means whereby the direction of the material being blown therefrom may be varied and whereby the amount of air being directed thereto from said discharge opening may also be varied.

2. The spreader of claim 1 wherein a gate is pivotally secured to said container and is adapted to close said closable opening.

3. The spreader of claim 1 wherein said container has a bottom with sides extending upwardly therefrom, said closable opening being formed in one of said sides at the lower end thereof.

4. The spreader of claim 3 wherein a baffle means is secured to the bottom of said container in the interior thereof adjacent said closable opening.

5. The spreader of claim 4 wherein said baffle means includes an inverted V-shaped member having a pair of inclined sides positioned at opposite sides of said closable opening.

6. The spreader of claim 4 wherein a bolt means extends through said baffle means, container bottom, chute means and said housing.

7. In a material spreader for use with a rotary lawnmower including a housing having a discharge opening formed therein, a container secured to said housing adjacent said discharge opening and having a closable opening formed therein adjacent its lower end, a chute means secured to said housing and having an upper end in communication with said closable opening and extending downwardly and outwardly therefrom, an air scoop means secured to said chute means and having one end in communication with said discharge opening, said air scoop means adapted to receive material from said chute means; said material on said air scoop means being blown from the other end thereof by the air being discharged from said discharge opening into said air scoop means, wherein said chute means includes a flat base portion which is secured to said housing above said discharge opening and a channel member secured thereto which extends downwardly and outwardly therefrom, said container being secured to said base portion, said air scoop means being secured to the lower end of said channel member.

8. The spreader of claim 7 wherein said housing includes a rounded discharge chute at least partially surrounding said discharge opening, said base portion having an auxiliary mounting plate positioned between it and said housing, said auxiliary mounting plate including a base plate which is secured to said housing and which has a pair of spaced apart legs extending downwardly therefrom which engage said rounded discharge chute.

9. In a material spreader for use with a rotary lawnmower including a housing having a discharge opening formed therein, a container secured to said housing adjacent said discharge opening and having a closable opening formed there adjacent its lower end, a chute means secured to said housing and having an upper end in communication with said closable opening extending downwardly and outwardly therefrom, an air scoop means secured to said chute means and having one end in communication with said discharge opening, said air scoop means adapted to receive material from said chute means; said material on said air scoop means being blown from the other end thereof by the air being discharged from said discharge opening into said air scoop means, wherein said air scoop means is comprised of a bottom having a pair of sides extending upwardly therefrom, said sides being pivotally secured to said chute member.

References Cited

UNITED STATES PATENTS

| | | | |
|---|---|---|---|
| 1,182,118 | 5/1916 | Tow et al. | 222—193 X |
| 1,396,319 | 11/1921 | Champlin | 222—193 X |
| 1,482,495 | 2/1924 | Westhaver | 222—193 |
| 2,217,577 | 10/1940 | Wenzelmann | 222—193 X |
| 2,803,085 | 8/1957 | Walberg | 222—193 |
| 3,013,695 | 12/1961 | Caldwell | 222—193 X |
| 3,375,644 | 4/1968 | Harper | 56—25.4 |

WALTER SOBIN, *Primary Examiner.*

U.S. Cl. X.R.

222—557, 564